Feb. 24, 1925.
L. W. ALLEN
APPARATUS FOR CURING INNER TUBES
Filed Sept. 20, 1921
1,527,161
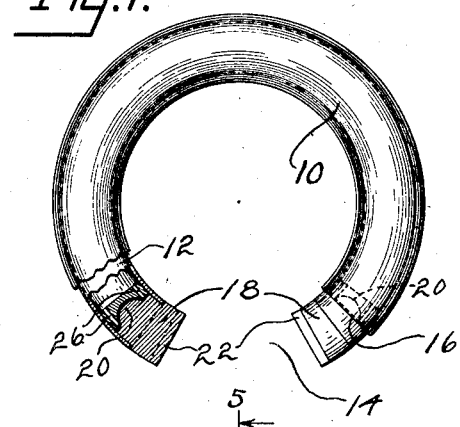
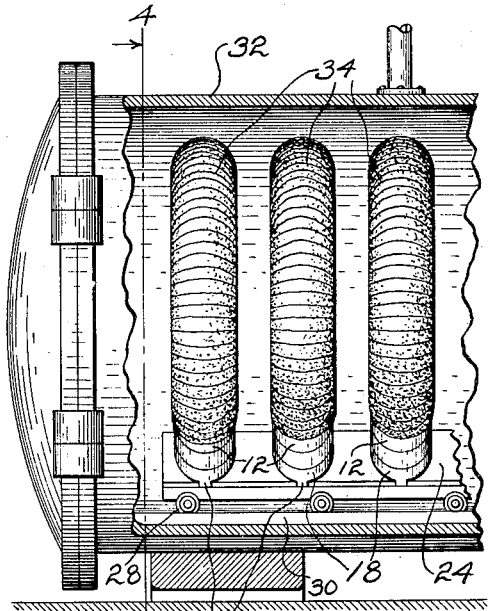
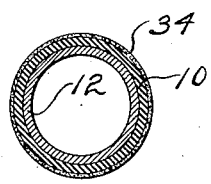
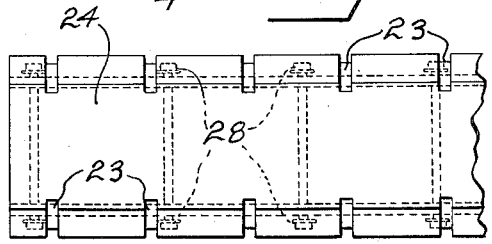
INVENTOR
LEROY W. ALLEN
BY
*Edward Taylor*
ATTORNEY Patented Feb. 24, 1925.

1,527,161

UNITED STATES PATENT OFFICE.

LEROY W. ALLEN, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR CURING INNER TUBES.

Application filed September 20, 1921. Serial No. 502,067.

*To all whom it may concern:*

Be it known that I, LEROY W. ALLEN, a citizen of the United States of America, residing at Chicopee Falls, in the county of Hampden and State of Massachusetts, have invented certain new and useful Improvements in Apparatus for Curing Inner Tubes, of which the following is a specification.

My invention relates to a method and apparatus for curing rubber inner tubes and refers more specifically to rubber tubes which are vulcanized upon curved mandrels.

The object of my invention is to uniformly vulcanize inner tubes upon curved mandrels and to provide a suitable apparatus for conveniently carrying out such vulcanization.

It is customary to vulcanize an inner tube which is mounted upon a curved mandrel having a circumferential gap, by suspending the mandrel in a heater with the circumferential gap uppermost. After the rubber tube has been mounted upon the mandrel, a bracket is rigidly fixed to the mandrel in such a manner as to bridge the gap and the whole is hung up in a heater, the weight of the combination being supported upon the bracket. Although this method of hanging up the mandrels during vulcanization is convenient from a handling standpoint, I have found that when the mandrel is so positioned in a heater, the tube is only partially vulcanized along an arc diametrically opposite the circumferential gap.

I have found that when a curved mandrel with a tube mounted thereon is positioned in a heater so that its circumferential gap is placed downwards I avoid the partial vulcanization of the tube midway between the tube ends, which partial vulcanization I find is characteristic in tubes vulcanized with the gap uppermost. I believe that condensation deposit in the mandrel of the vulcanizing fluid during vulcanization of the tube is a chief cause of the local partial vulcanization and for that reason I turn my mandrel as described to prevent any such deposits from forming. In vulcanizing with the gap down, the ends of the tube are the lowest portions of the tube in the heater. I am aware that there is a very slight difference in temperature between the upper and lower parts of the heaters ordinarily used. This difference works as an advantage rather than a detriment for it is desirable that there be a tendency to slightly undercure the ends or lower portions of the tube, for it is customary in a subsequent operation after the ends of the tube have been lapped spliced to give them a final steam cure. The final steam cure will completely vulcanize the spliced portion and will result in making a tube which is uniformly vulcanized throughout. For carrying out my new method of vulcanization I have designed an apparatus by means of which I can accomplish the vulcanization of rubber tubes with the same ease as though I hung the tubes up during vulcanization as explained in the previous paragraph.

My invention will now be explained with reference to the accompanying drawings; in which, Fig. 1 shows a side view of a rubber tube mounted upon a circular mandrel which has a circumferential gap;

Fig. 2 is an enlarged vertical cross-sectional view through a segment of the mandrel adjacent the circumferential gap and through a means I use in adapting an ordinary curved mandrel to my apparatus;

Fig. 3 is a cross-section taken on line 3—3 of Fig. 2;

Fig. 4 is a front view of a mandrel which is supported in a heater ready to be vulcanized according to my method.

Fig. 5 is a broken away side view of a heater showing several mandrels supported ready for vulcanization;

Fig. 6 is a plan view of the truck for supporting the mandrels and running them in and out of the heater; and Fig. 7 is a cross-section taken on line 7—7 of Fig. 4.

A rubber tube 10 is mounted upon a circular mandrel 12, which has a circumferential gap 14, the ends 16 of the rubber tube terminating a little distance back from the edges of the gap. At the circumferential break in the mandrel are two blocks 18 having a force fit with the mandrel and adapted to be easily renewed when worn conditions require such renewal. The blocks 18 are provided with flanges 20 and 22, the flange 20 acting in a slot 21 in the mandrel and being tightly wedged therein and the flange 22 being adapted to fit snugly in grooves 23 of a carriage 24. The mandrel, the block 18 and the carriage 24 are all provided with drain ports 26, which ports line up in order to allow a vulcanizing fluid to enter the inside of the mandrel during vulcanization of the tube and also to allow condensation formed in the mandrel to flow out. The carriage 24 is supported upon the wheels 28 which roll on the tracks 30 and provide an easy method of running the carriage in and out of the heater 32.

The procedure in placing tubes in the heater and taking them out is greatly facilitated by means of my apparatus. After a tube has been mounted upon a circular mandrel and has received the spiral wrapping 34, the mandrel is placed upright as shown in Figs. 4 and 5. The flange 22 is sloped at such an angle 36 so that as the mandrel is placed in the grooves 23 of the carriage it will wedge itself down and be firmly held in an erect position. Loading and unloading the mandrel onto the carriage only requires setting the mandrel in or taking it out of the grooves 23.

By means of my apparatus I can thus handle the tubes during vulcanization more easily than if they were hung up across the circumferential gap. In detecting the localized defects in the tubes vulcanized by the old method and obviating that difficulty by standing the tubes up rather than suspending them, I produce a tube which is far superior to the tubes vulcanized by the old method.

Having thus described my invention, I claim:

1. An apparatus for supporting a plurality of substantially circular mandrels which have circumferential gaps and upon which rubber tubes are mounted during vulcanization; comprising a plurality of bearing surfaces adapted to receive and wedgingly support the mandrels in substantially vertical positions.

2. An apparatus for supporting a plurality of substantially circular mandrels which have circumferential gaps and upon which rubber tubes are mounted during vulcanization; comprising a carriage and several pairs of wedge grooves cut in the top of the carriage, each pair of wedge grooves being adapted to receive mandrel flanges which are located adjacent the circumferential gap of each mandrel and to support the mandrels in substantially vertical positions.

3. A supporting means for a mandrel having a circumferential gap, comprising a pair of lugs adapted to fit into the mandrel at the edges of the gap, one or more ports through the supporting means allowing passage of a fluid between the interior of the mandrel and the vulcanizing medium and a means for wedgingly supporting the mandrel upon a stand.

4. A supporting device for a mandrel having a circumferential gap, comprising plugs adapted to fit within the end of the mandrel, and a device having interfitting connection with the plugs for releasably holding the mandrel in an upright position.

5. A supporting device for a mandrel having a circumferential gap, comprising plugs adapted to fit within the end of the mandrel, and a device having interfitting connection with the plugs for releasably holding the mandrel in an upright position, said plugs having passages for permitting the passage of a vulcanizing fluid.

LEROY W. ALLEN.